United States Patent
Nevidomsky et al.

(10) Patent No.: US 12,206,463 B2
(45) Date of Patent: Jan. 21, 2025

(54) NETWORK SWITCHING DEVICE AND METHOD FOR OPERATING OF NETWORK SWITCHING DEVICE

(71) Applicant: Samsung Electronics Co., Ltd., Suwon-si (KR)

(72) Inventors: Alex Yurievich Nevidomsky, Moscow (RU); Maksim Alexeevich Shikunov, Moscow (RU); Liubov Vladimirovna Stepanova, Moscow (RU); Vladimir Petrovich Bogachev, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 17/298,855

(22) PCT Filed: Apr. 16, 2021

(86) PCT No.: PCT/KR2021/004809
§ 371 (c)(1),
(2) Date: Jun. 1, 2021

(87) PCT Pub. No.: WO2022/071639
PCT Pub. Date: Apr. 7, 2022

(65) Prior Publication Data
US 2022/0322187 A1  Oct. 6, 2022

(30) Foreign Application Priority Data

Oct. 2, 2020 (RU) ................................ 2020132558
Apr. 7, 2021 (KR) ........................ 10-2021-0045042

(51) Int. Cl.
H04W 36/30 (2009.01)
H04B 17/318 (2015.01)
(Continued)

(52) U.S. Cl.
CPC ...... *H04B 17/318* (2015.01); *H04W 36/1446* (2023.05); *H04W 36/305* (2018.08); *H04W 36/326* (2023.05)

(58) Field of Classification Search
CPC ....... H04W 4/02; H04W 4/023; H04W 4/029; H04W 4/12; H04W 8/005; H04W 36/32; H04W 48/16; H04W 36/30
(Continued)

(56) References Cited

U.S. PATENT DOCUMENTS

| 9,134,398 B2 | 9/2015 | Dupray et al. |
| 9,565,625 B1 | 2/2017 | MacNeille et al. |

(Continued)

FOREIGN PATENT DOCUMENTS

| CN | 101803424 A | 8/2010 |
| CN | 105375995 A | 3/2016 |

(Continued)

OTHER PUBLICATIONS

Machine translation of WO 2017097015 (Year: 2017).*
(Continued)

*Primary Examiner* — Harun Chowdhury
(74) *Attorney, Agent, or Firm* — Jefferson IP Law, LLP (57) ABSTRACT

Provided is a method for operating network switching by a mobile device. The method comprises the steps of connecting to a Wi-Fi network, detecting an interruption of a Wi-Fi signal, while connecting to the Wi-Fi network, obtaining a probability that the mobile device belongs to an exit zone, in response to detecting the interruption of the Wi-Fi signal, disconnecting the Wi-Fi network and connecting to a cellular network when the probability that the mobile device belongs to the exit zone is greater than or equal to a predetermined threshold value, and maintaining connection to the Wi-Fi network when the probability that the mobile
(Continued)

device belongs to the exit zone is less than the threshold value.

12 Claims, 5 Drawing Sheets

(51) Int. Cl.
*H04W 36/14* (2009.01)
*H04W 36/32* (2009.01)

(58) Field of Classification Search
USPC .................. 370/252, 329, 331, 352; 709/203
See application file for complete search history.

(56) References Cited

U.S. PATENT DOCUMENTS

| | | | |
|---|---|---|---|
| 9,596,653 | B2 | 3/2017 | Black et al. |
| 9,742,481 | B1 | 8/2017 | Jorgovanovic et al. |
| 10,375,641 | B2 | 8/2019 | Fraley |
| 10,939,367 | B1 * | 3/2021 | Koshy .................. H04W 4/023 |
| 2008/0032628 | A1 | 2/2008 | Vehvilainen et al. |
| 2009/0103496 | A1 | 4/2009 | Purkayastha et al. |
| 2009/0116447 | A1 | 5/2009 | Balasubramanian et al. |
| 2010/0161720 | A1 * | 6/2010 | Colligan ................. H04W 4/02 |
| | | | 711/E12.002 |
| 2012/0163344 | A1 | 6/2012 | Bakthavathsalu et al. |
| 2013/0074125 | A1 | 3/2013 | Hao et al. |
| 2014/0222570 | A1 | 8/2014 | Devolites et al. |
| 2016/0135144 | A1 | 5/2016 | Tsai et al. |
| 2018/0279403 | A1 | 9/2018 | Kim |
| 2018/0310216 | A1 | 10/2018 | Fu et al. |
| 2020/0107238 | A1 | 4/2020 | Silberstein et al. |

FOREIGN PATENT DOCUMENTS

| | | |
|---|---|---|
| CN | 107770860 A | 3/2018 |
| CN | 108712715 A | 10/2018 |
| CN | 105375995 B | 3/2019 |
| CN | 109413587 A | 3/2019 |
| CN | 109769280 A | 5/2019 |
| RU | 2536175 C2 | 4/2013 |
| WO | 2016/007836 A1 | 1/2016 |
| WO | WO-2017097015 A1 * | 6/2017 |
| WO | 2020/068903 A1 | 4/2020 |
| WO | WO-2021169698 A1 * | 9/2021 ............ H04W 36/30 |

OTHER PUBLICATIONS

WO2021169698_Machine Translation (Year: 2021).*
International Search Report with Written Opinion dated Jul. 23, 2021; International Appln. No. PCT/KR2021/004809.

* cited by examiner

NETWORK SWITCHING DEVICE AND METHOD FOR OPERATING OF NETWORK SWITCHING DEVICE

CROSS-REFERENCE TO RELATED APPLICATION(S)

This application is a U.S. National Stage application under 35 U.S.C. § 371 of an International application number PCT/KR2021/004809, filed on Apr. 16, 2021, which is based on and claims priorities of Russian patent application number 2020132558 filed on Oct. 2, 2020 in the Russian Patent Office and a Korean patent application number 10-2021-0045042 filed on Apr. 7, 2021 in the Korean Intellectual Property Office, the disclosures of which are incorporated by reference herein in its entirety.

TECHNICAL FIELD

The present invention relates to methods and apparatus for network switching.

BACKGROUND ART

The use of automatic switching between a cellular network and a Wi-Fi network (Wireless Fidelity) is widely used by users. Auto switch can be done when Wi-Fi signal drops, and auto switch can be done every time a weak Wi-Fi signal is detected.

An unstable Wi-Fi connection within a Wi-Fi zone results in areas in the Wi-Fi zone where the Wi-Fi signal unstably disappears and reappears. If the Wi-Fi connection is still available despite the intermittent signal, the user experiences delays in using Internet services. In some cases, a mobile device located in such an unstable area may switch from a Wi-Fi network to a cellular connection without any notification to the user. In this case, the user may lose money for using the corresponding cellular communication, although he could use an unlimited Wi-Fi network.

From a document US 20140302852 A1 published on 9 Oct. 2014, known is a method for using sensor data to improve the evaluation of the user's location using Bayesian filtering. After obtaining this evaluation, the device switches to the closest access point. The disadvantage of this method is that the location data of the Wi-Fi access points is required.

From a document CN 109769280 A published on 17 May 2019, known is a method to switch smart Wi-Fi prediction based on machine learning. The method consists of three steps. The data on whether there was a switch from a Wi-Fi network to a cellular network or not, is collected during the training phase. Targets are then assigned based on whether the device switched to a different network. Finally, a neural network trained on this data is used to predict the probability of a handoff in the future. The disadvantage of this solution is that training a neural network requires a significant amount of energy. Unintentional handoffs can increase user spending on cellular data. Also, this prediction is only based on the signal at a specific location of the user, without taking into account the signals in the nearby locations of the user.

From a document US 20160360461 A1 published on 8 Dec. 2016, known are systems and methods to prevent blocking of a network connection on a device. The method is based on monitoring two network states, Wi-Fi and cellular. Various modes are activated on the device depending on the quality of the monitored signal. Depending on the activated mode, different application settings are applied. The disadvantages of the known solution are the intense power consumption due to the simultaneous monitoring of two networks and unintentional handover, which can increase the user's expenses for cellular communication.

From a document US 2020037392 A1 published on 30 Jan. 2020, a method and device for intelligent control of a Wi-Fi connection is known. The method is based on real-time analysis of data transmission over Wi-Fi (including bit rate, frequency and interval of Tx and Rx packets), which is used to determine when to switch from Wi-Fi to a cellular network. The known method operates poorly in attenuation zones. The method also does not prevent switching to cellular when it is preferable to keep the Wi-Fi connection.

DISCLOSURE

Technical Problem

Existing methods involve switching to cellular based on certain thresholds. However, there may be several areas with a weak Wi-Fi signal inside a Wi-Fi zone. Thus, users may experience significant inconvenience as they wait for a Wi-Fi connection and the mobile device switches to cellular. If the Wi-Fi signal strength drops to a certain threshold, then it automatically switches to cellular communication, the user may not always notice the switching. Thus, when using cellular communication in the area where Wi-Fi should be used, the user may lose money to pay for cellular communication. It is necessary to prevent such a sudden automatic network switching from Wi-Fi to a cellular network within the Wi-Fi network distribution area.

Technical Solution

According to an embodiment of the present disclosure, provided is a method for operating network switching by a mobile device, comprising connecting to a Wi-Fi network; detecting an interruption of a Wi-Fi signal, while connecting to the Wi-Fi network; in response to detecting the interruption of the Wi-Fi signal, obtaining a probability that the mobile device belongs to an exit zone; when the probability that the mobile device belongs to the exit zone is greater than or equal to a predetermined threshold value, disconnecting the Wi-Fi network and connecting to a cellular network; and when the probability that the mobile device belongs to the exit zone is less than the threshold value, maintaining connection to the Wi-Fi network.

According to another embodiment of the present disclosure, provided is a mobile device for operating network switching, comprising a transceiver, a memory, and a controller connected to the transceiver and the memory, the controller being configured to connect to a Wi-Fi network; detect an interruption of a Wi-Fi signal, while connecting to the Wi-Fi network; in response to detecting the interruption of the Wi-Fi signal, obtain a probability that the mobile device belongs to an exit zone; when the probability that the mobile device belongs to the exit zone is greater than or equal to a predetermined threshold value, disconnect the Wi-Fi network and connect to a cellular network; and when the probability that the mobile device belongs to the exit zone is less than the threshold value, maintain connection to the Wi-Fi network.

According to still another embodiment of the present disclosure, provided is a computer-readable storage medium for operating network switching including instructions stored thereon, in which the instructions, when executed by a controller included in a mobile device, cause the mobile device to connect to a Wi-Fi network; detect an interruption of a Wi-Fi signal, while connecting to the Wi-Fi network; in response to detecting the interruption of the Wi-Fi signal, obtain a probability that the mobile device belongs to an exit zone; when the probability that the mobile device belongs to the exit zone is greater than or equal to a predetermined threshold value, disconnect the Wi-Fi network and connect to a cellular network; and when the probability that the mobile device belongs to the exit zone is less than the threshold value, maintain connection to the Wi-Fi network.

DESCRIPTION OF THE DRAWINGS

The above and other features and advantages of the present invention are illustrated in the following description, by way of examples only, with reference to the accompanying drawings, wherein.

MODE FOR INVENTION

Advantages and features of the present invention, and a method of achieving the same will become apparent with reference to the embodiments described below in detail, along with the accompanying drawings. However, the present invention is not limited to the embodiments disclosed hereinafter, but may be implemented in various different forms. Further, it should be noted that those embodiments are provided to make more the disclosure of the invention more complete and fully inform the scope of the invention to those having ordinary knowledge in the technical filed to which the present invention belongs. Therefore, the present invention shall be only defined by the scope of the claims as follows.

Although terms such as 'first', 'second', and the like are used to describe various elements throughout the disclosure, it should be appreciated that these elements are not limited by these terms, and these terms are only used to distinguish one element or component from another one. Therefore, it goes without saying that a first element/component set forth in the description may be substituted by a second element/component without departing the technical idea of the present invention.

The present invention resolves situations when, for example, a user of a mobile device leaves the Wi-Fi network space and continues to catch a weak Wi-Fi signal, instead of switching to a cellular connection, or when the user approaches the edge of the Wi-Fi network space but does not leave from the Wi-Fi network space and at the same time switching to cellular communication, or situations of poor connection with the Wi-Fi network when, for example, the user stands with back to the Wi-Fi router and switches from the Wi-Fi network to a cellular connection, which must be paid for. With the help of the invention, a single Wi-Fi network area is provided in which Wi-Fi is available without reducing the signal strength, and when the user leaves the Wi-Fi network area, the mobile device switches to cellular services.

It should be noted that the proposed invention can be used in any suitable computing device of a user including a processor and memory storing instructions for the processor to perform the steps of the proposed method. Such a device may be, although not limited to, a smartphone, smart watch, and other suitable devices.

The proposed method allows to overcome these difficulties by analyzing the behavior of the user of the mobile device in Wi-Fi network areas. Based on this analysis, the zones can be roughly divided into two groups: an inner zone, which includes all locations within the space where the Wi-Fi network operates regardless from signal strength of the Wi-Fi, and an exit zone (for locations outside the Wi-Fi network space) where Wi-Fi turns off and the mobile device switches to cellular.

Received signal strength indicator (RSSI) may be used for measure the strength of the Wi-Fi signal, namely, the total power of the signal being received by the receiver is measured by the receiver in dBm (dBm, decibel relative to 1 milliwatt). Further, RSSI denotes the received signal strength indicator of the Wi-Fi network.

Data collection and auto-tagging are initialized when a Wi-Fi device is connected. RSSI is measured at regular intervals when the user's movement is detected by the user's movement sensor. The proposed method is implemented in the user's mobile device. Therefore, the measurement may be performed by the user's mobile device using a Wi-Fi adapter and embedded software for the user's mobile device. The user's movements may be determined using an accelerometer or pedometer embedded into the mobile device and the embedded software for the user's mobile device.

As soon as the user enters the space where the Wi-Fi network operates and connects to the Wi-Fi network, the network scans and stores the RSSI sets from all visible routers (Wi-Fi routers) extending to the user's mobile device, wherein the data sets (RSSIs) are collected at specified intervals on the user's mobile device. The routers, visible to the user's mobile device, may be located in any place in the room where the user is located. The user's mobile device has a Wi-Fi adapter, so RSSI scanning occurs where the mobile device is located. The RSSI is stored in the long-term memory of the mobile device. All data is stored in the user's mobile device, the training of the classifier and the control of switching from the Wi-Fi network to the cellular network or vice versa also occur in the user's mobile device.

Figure 1:
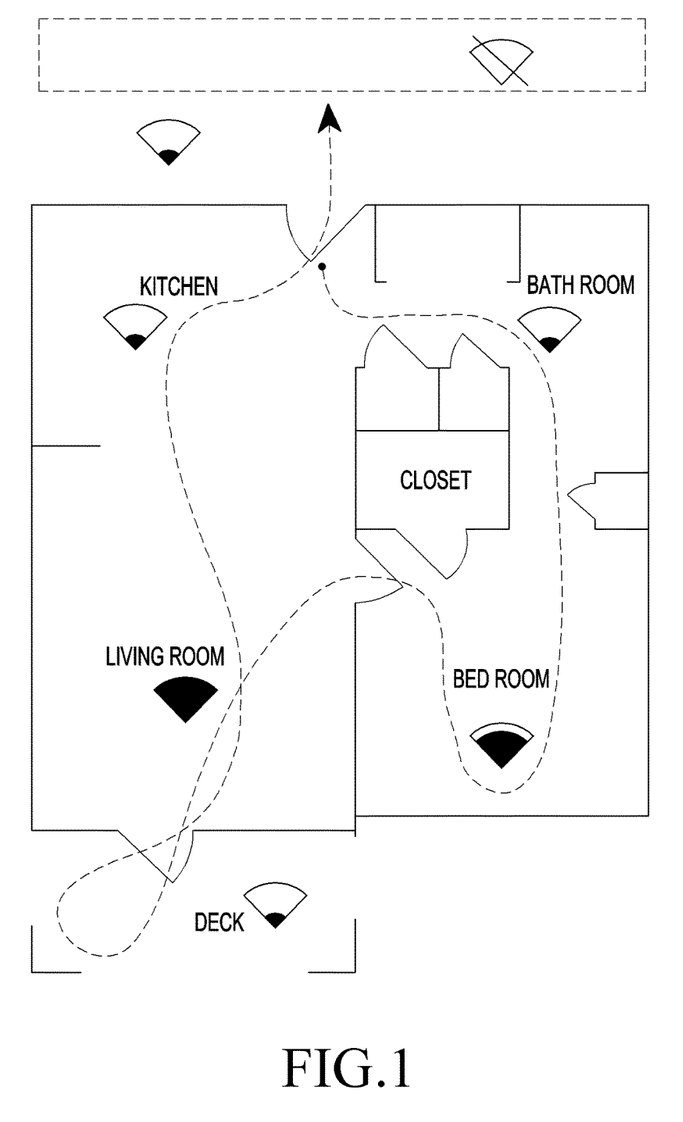
FIG. 1 illustrates the trajectory of a user's movement in an inner Wi-Fi zone and exiting into an exit zone.

FIG. 1 shows the area of a Wi-Fi network that covers an exemplary room. The route of movement of the user with the mobile device is shown within the room where the router (Wi-Fi router) is located. In some parts of the room, the Wi-Fi network signal may be low, or completely disappear when the user leaves the area of the Wi-Fi router, or, for example, turns his back on the Wi-Fi router or goes into a room farther from the Wi-Fi router.

Figure 2:
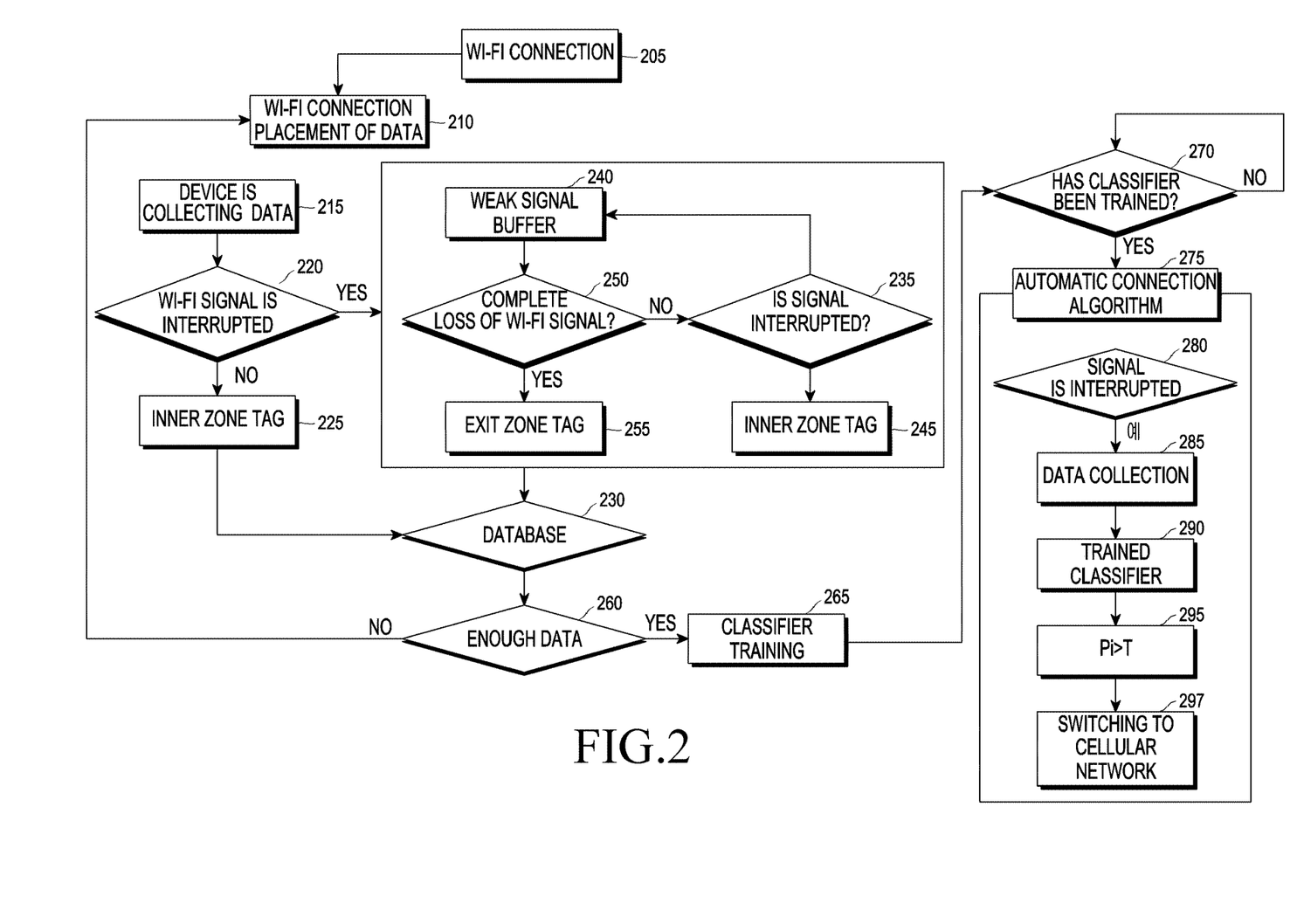
FIG. 2 illustrates a block diagram of a network switching method, data collection, classifier training, and automatic network switching according to an embodiment of the present invention.

FIG. 2 illustrates a block diagram of a network switching method according to an embodiment of the present invention.

After the Wi-Fi adapter of the network switching device, located in the user's mobile device (for example, a smartphone), is connected to the Wi-Fi network (205), the network switching device including the software, the Wi-Fi adapter and the user's movement sensor may initiate collecting data (210). The data collected may include a BSSID (basic service set identification) data set (i.e., a Wi-Fi router identifier), and an RSSI data set. Data collection can be done at specified regular intervals of time.

When collecting data (215), areas with a strong Wi-Fi signal and areas where the Wi-Fi signal is not interrupted are tagged, "inner area" (220, 225) and immediately added into the database (230). The database may include BSSID-RSSI pairs without coordinates.

If, during data collection, a weak interrupted Wi-Fi signal is detected (that is, detected are a loss of data packets and an unstable connection with the main Wi-Fi access point) (220, 235), then such data is stored in a weak signal buffer (240). In this case, if the user returns to an area with a strong Wi-Fi signal (235), the buffered data is marked as an "inner zone" (245) and added to the database (230).

If the user, after a weak signal, enters a zone where the RSSI is below the minimum level allowed for operation, and Wi-Fi is turned off (250), the buffered data is marked as an "exit zone" (255) and added into the database (230).

That is, the Wi-Fi network space is divided into an inner zone where the mobile device should not switch from a Wi-Fi network to a cellular connection, and an exit zone where the Wi-Fi network ends and where the user with the mobile device is located when he leaves the inner zone. Switching from Wi-Fi to cellular should happen in the exit zone since the Wi-Fi network does not apply to the exit zone.

The following data are automatically entered into the network switching device located in the user's mobile device:

$UD_i \in R^K$—user data, including $R^K$ (an ordered set of k real numbers). Such data may include time data, days of the week, user trajectory, viewed applications at a given point of time, data from applications, browser, phone sensors and other data; and $FP_i \in R^M$—RSSI at time i, wherein $R^M$ is a vector of real numbers of dimension M, and a set of FPi data, that is a set of RSSI values collected over a given period of time, is a vector with RSSI values.

The proposed network switching device operates as follows (see a flowchart diagram in FIG. 2):

1. In the Wi-Fi network zone, a Wi-Fi router is turned on and the user connects the mobile device to the Wi-Fi network (205).

2. The Wi-Fi signal scanner, located in the automatic data collection unit of the network switching device, turns on. A Wi-Fi signal scanner collects Wi-Fi channel information to determine if the current connection is strong or weak (210, 215). Wi-Fi channel information may include, although not limited thereto, BSSID (basic service set identification), SSID (service set identification), RSSI (received signal strength indicator), the number of bad packets of TX packets, the number of beacons lost, and the number of retransmissions.

3. If good connectivity is detected, the background scan service is activated. The background scan service (or user data scanner) may collect $UD_i$ and $FP_i$ user data into a database and mark it as an "inner zone", that is, $y_i=0$ (225).

4. If a bad connection condition is detected, the weak Wi-Fi signal scanning service may be activated (220, 235). The Wi-Fi weak signal scan service may collect $Ud_i$ and $FP_i$ user data into a weak signal buffer (240).

If the Wi-Fi signal is lost or Wi-Fi is manually disabled by the user and the connection is not restored within the predetermined N seconds (250), then the $Ud_i$ and $FP_i$ data may be marked as an "exit zone", that is, $y_i=1$ (255).

If the Wi-Fi signal is restored within the predetermined N seconds, at least one more measurement may be made at subsequent times, and if the Wi-Fi signal is also detected, then the $UD_i$ and $FP_i$ data may be marked as an "inner zone", that is, $y_i=0$ (245).

5. The tagged data is stored in the database (230), and the above process steps 1 to 4 may be repeated until a sufficient amount of tagged data has been received with a sufficient amount of tagged data set in advance (260).

After collecting the data, the classifier is trained (265). The classifier, after training, is used to automatically decide whether to switch the mobile device into a cellular connection or not switch and continue to use the Wi-Fi network. There may be a plurality of target Wi-Fi points for which the classifier is trained. Accordingly, there may be a plurality of trained classifiers.

Let's take a closer look at the steps of the proposed method.

A user who is in a Wi-Fi network area may connect a mobile device to a Wi-Fi network.

Further, the process of automatic data collection may be implemented in the automatic data collection unit. Automatic data collection may include the collection and automatic targeting data. As soon as the network switching device located in the user's mobile device is ready to collect data, it is determined whether the Wi-Fi signal is interrupted. This readiness may be determined in different ways, for example, the accelerometer may detect the user's movement, or data collection may be initiated every N minutes, or other specified conditions may be triggered. If the Wi-Fi signal is not interrupted, then all $FP_i$ will receive an inner zone tag. If the Wi-Fi signal is interrupted, then all $FP_i$, collected after the interrupted signal is detected, may be collected in a weak Wi-Fi signal buffer. If there is a complete loss of Wi-Fi signal, then all $FP_i$ from the weak Wi-Fi signal buffer may get the exit zone tag. If the interrupt signal condition does not repeat, i.e. the signal stabilizes for a certain predetermined time, then all $FP_i$ from the buffer may get the inner zone tag. All $FP_i$ with tags are saved into the database. As soon as there are enough $FP_i$ with tags in the database, training of the classifier may be initiated. The $FP_i$ with tags may be input to a machine learning algorithm, which can be any suitable algorithm such as e.g., a logistic regression algorithm, but any other algorithm may be used instead, including neural networks.

Once the classifier is trained (270), the automatic network switching process starts (275). From this point on, two processes—automatic data collection and automatic network switching—may operate simultaneously.

The automatic network switching algorithm operates as follows. The Wi-Fi signal intermittent condition is checked. If the Wi-Fi signal is not interrupted, the decision to stay in the Wi-Fi network is made. If the Wi-Fi signal is interrupted (280), then prediction data collection is initiated (285). $FP_i$ are collected at the point where the user's mobile device is located at a given point in time. Each $FP_i$ enters the input of a trained classifier, which makes a prediction (290), wherein if the probability of this $FP_i$ belonging to the exit zone is higher than a predetermined threshold T (that is, $P_i>T$) (295), then a decision is made to switch to cellular communication (297).

Moreover, the threshold T is set in advance and is determined so as to minimize the disconnection of the Wi-Fi network when the user's mobile device is in the inner zone, but at the same time so that switching occurs when the user's mobile device enters the exit zone.

All data used for prediction, with tags, which are obtained depending on user actions, may be also saved to the database for subsequent retraining of the classifier. If the probability $P_i$ is below a certain threshold T, a decision is made to stay in the Wi-Fi network, and then it is again checked whether the Wi-Fi signal is being interrupted.

After training the classifier, when the network switching device is operating, the classifier may predict the user location zone as the Wi-Fi signal strength decreases. If the classifier predicts that the user is in the inner zone, then the mobile device does not switch from the Wi-Fi network to the cellular network. If the classifier predicts that the user leaves the inner zone to move to the exit zone, then the mobile device switches from the Wi-Fi network to the cellular network.

Figure 3:
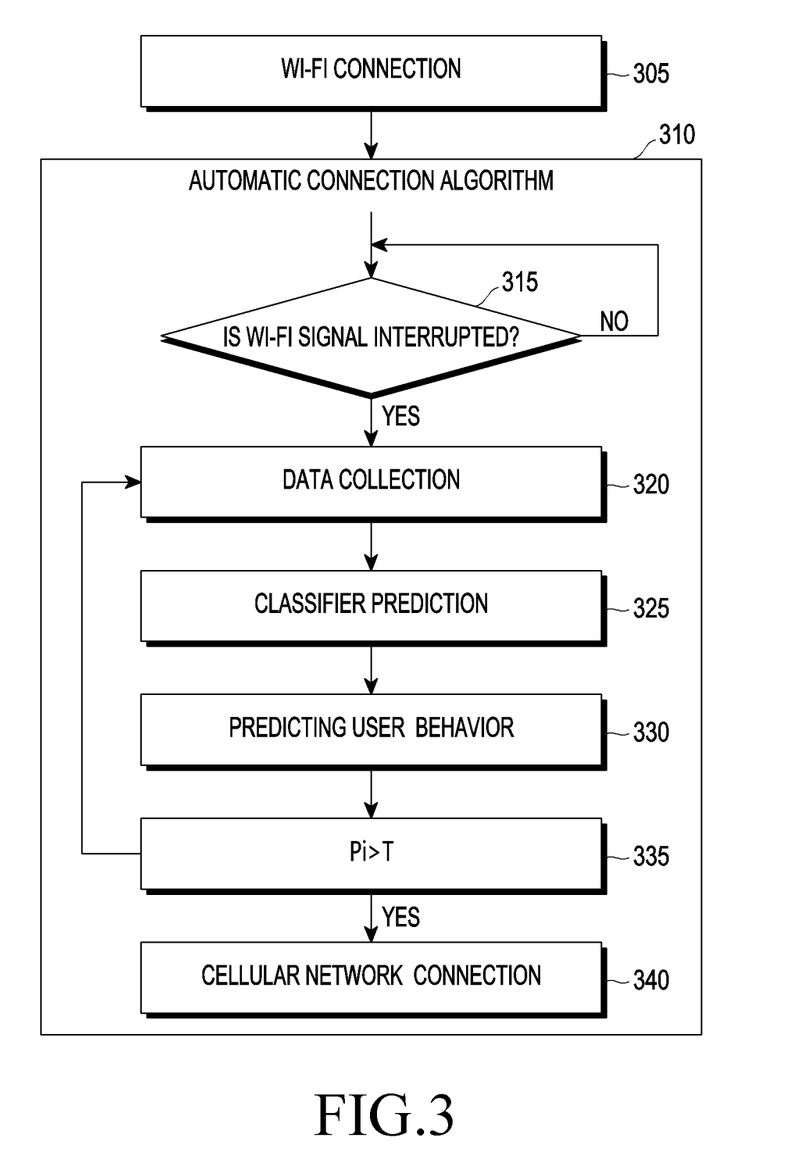
FIG. 3 illustrates an addition to an automatic network switching unit according to an embodiment of the present invention.

In addition to the automatic network switching unit, an additional user behavior prediction unit may be used, a block diagram of which is shown in FIG. 3. After connecting to the Wi-Fi network (305), an automatic connection algorithm (310) may be performed. At the time of $FP_i$ collection, user-related data may be additionally collected, wherein the user-related data may include, for example, at least one of data about applications that the user is using at a given time, a time of the day, a day of the week, data from phone sensors, and so on. Then, it is checked if the Wi-Fi signal is interrupted. If the Wi-Fi signal is interrupted (315), then data collection for prediction is started (320). The $FP_i$ is passed to a trained classifier that predicts the mobile device's location in the exit zone (325), as described above. Further, the obtained predictions, together with some user data that may include at least one of a time of the day, a day of the week, data from the sensors of mobile devices, the user's trajectory, data about user applications, and the like, may be used to estimate the probability of entering the exit zone (330). If this obtained probability is higher than a certain threshold, that is, $P_i>T$ (335), then a decision is made to automatically switch to mobile communication (340).

For example, data about the user's movements may be used as additional data. In this case, the user's location at a certain point may be also determined by $FP_i$. If a certain set of points is used, then the user's trajectory can be obtained. Each $FP_i$ point is fed to the input of the classifier, and a prediction result (for example, the probability of this point belonging to the exit zone) is obtained. Further, these results of the operation of the classifier on a set of points are fed to the "user behavior prediction unit". Since the trajectory of the user's movement, that is, several points are used, it is possible to predict the user's behavior. The probabilities obtained at each point are combined, for example, by exponential smoothing, and a uniform probability of entering the exit zone along the user's path is obtained. Also, additional information may be used, such as a time and a day of the week. Then, at different times, the user's behavior, that is, his/her trajectory of movement may differ. This information may be added directly to the classifier along with the $FP_i$ points, i.e. vectors including both $FP_i$ and some information (e.g., such as information on the current time) will be fed to the input of the classifier both during training and prediction.

Thus, when the user leaves the area of the Wi-Fi network, the mobile device switches from the Wi-Fi network to the cellular network. When a user just walks to the edge of a Wi-Fi network or enters an area of a Wi-Fi network where its signal strength is low, the mobile device does not switch from the Wi-Fi network to the cellular network. It should be noted that, in contrast to the prior arts, the decision to switch from a Wi-Fi network to a cellular network is made by an automatic network switching unit based on a large number of measurements at different points in time along the trajectory of a user with a mobile device inside the Wi-Fi network zone.

If there was a loss of Wi-Fi signal or the user turned off Wi-Fi himself, and for a certain period of time the signal did not recover (for example, after N seconds), then all $FP_i$ from the buffer are marked as an exit zone. Otherwise, the collected $FP_i$ continues to be added to the buffer. If there is a switch from one Wi-Fi to another or the Wi-Fi router stops functioning, then $FP_i$ are removed from the buffer and not taken into account. If it is also necessary to track the switching from Wi-Fi to another Wi-Fi, then such $FP_i$ can be saved to the database with the tag "transmission zone".

Figure 4:
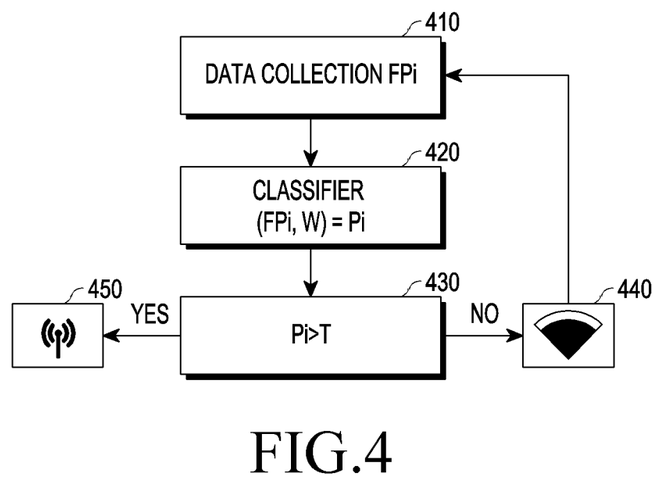
FIG. 4 illustrates an operation algorithm of a trained classifier according to an embodiment of the present invention.

FIG. 4 illustrates an operation algorithm of a trained classifier according to an embodiment of the present invention.

After collecting data $FP_i$ (410), the i-th data element is input to the trained classifier, in which w—the trained parameters of the classifier are located. Further, the classifier may determine $P_i$, that is, the probability that the i-th data element belongs to the switching zone (to the exit zone) (420). If this probability $P_i$ is greater than a certain threshold T (430), then the mobile device switches to the cellular network (450). Then, if $P_i$ is less (or no more than) than a certain threshold T (430), then the mobile device retains connected to the Wi-Fi network (440) and continues data collection. Thus, even with a weak Wi-Fi signal, the mobile device retains connected to the Wi-Fi network, since the user is inside the Wi-Fi zone.

By predicting user behavior, a faster transition from Wi-Fi to cellular can be achieved.

To reduce the waiting time for switching Wi-Fi to the cellular network, the device may predict the user's trajectory based on the collected data. According to the prediction results, one of the scenarios is launched in the mobile device, wherein if it is predicted that the user leaves the Wi-Fi zone, then the network with a weak Wi-Fi signal switches to the cellular network, and if it is predicted that the user does not leave the Wi-Fi zone, then the network with a weak Wi-Fi signal will not switch to the cellular network.

With the help of the present invention, it is possible to make notifications for the user, depending on where the mobile device that the user carries is located. For example, if it is determined that the user is leaving the apartment, the mobile device may notify a weather forecast.

The device can be used to control the switching of a mobile device from a Wi-Fi network to a cellular network, as well as collect data at regular intervals, enabling notifying the user of everyday things. For example, the mobile device may send a reminder to set an alarm if the user located in the bedroom and the time for sleep has come, or inform the need to turn off a stove if the user is in the kitchen for cooking, or provide a TV program guide and so on if the user is in the living room near a TV. That is, once the user performs some kind of everyday action in a certain place of the Wi-Fi network zone, and then, the user with a mobile device enters the same zone, the mobile device can remind the user about the actions in the place, based on the prediction. In this case, the process of automatic data collection and marking may change. The tags of the inner zone and the exit zone may be replaced with the tags of user actions performed in the same location. For example, if a user in a certain place of the Wi-Fi network performs a certain action of which the mobile device already "knows" (for example, such as using an application with recipes, or turning on a TV program through the Smart TV application, or setting an alarm), then the next time the user will stay in the same place, the user may be prompted a hint that one or more of the corresponding applications may be preferably used now. For example, these applications will be given priority over others and will load early and faster.

The data may be updated constantly, and the process of data collection and prediction may be carried out in parallel. That is, earlier data is deleted and replaced with newer data obtained over the last time intervals. The data is collected by the device located in the mobile device. When the memory for storing this data is full, then the data begins to be deleted, starting with the oldest in terms of storage time. The process of deleting old data and collecting new data is carried out constantly during the operation of the mobile device. Classifier training can occur, for example, when a mobile device is recharged and connected to a Wi-Fi network. The more data is collected and the more classifier training is conducted, the more accurate the prediction will be and the more clearly and quickly the mobile device will respond to user behavior.

If the user is in a room with multiple Wi-Fi routers, switching from Wi-Fi to cellular may be replaced by switching from one Wi-Fi to another Wi-Fi. Moreover, each Wi-Fi router uses its own trainable classifier.

If the user independently switched from a Wi-Fi network to a cellular network in the area of a strong Wi-Fi network signal, the prediction data recording stops at that moment. If the user independently switched from a Wi-Fi network to a cellular network in an area of a weak Wi-Fi network signal, then the data is marked as exit data to an exit zone and the next time the user enters this area, the mobile device will automatically switch from the Wi-Fi network to cellular network.

Thanks to the proposed invention, the user's behavior with a mobile device can be predicted. That is, a fast switching from a Wi-Fi network to a cellular network or another Wi-Fi network can be achieved without delay when a user with a mobile device leaves the Wi-Fi network zone, while the Wi-Fi network does not switch to cellular network within the Wi-Fi network zone, even with low Wi-Fi signal.

When using logistic regression as a classifier, as well as exponential smoothing over a certain number of predicted probabilities, the final decision on switching is made based on the results on the user's trajectory, and not on a single point.

Figure 5:
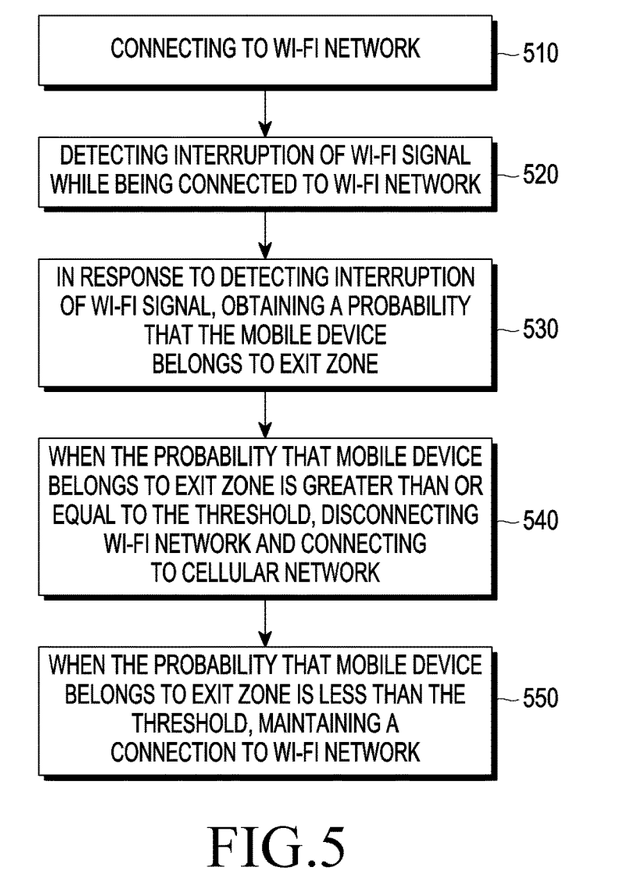
FIG. 5 is a flowchart illustrating the operation of a mobile device according to an embodiment of the present invention.

FIG. 5 is a flowchart illustrating the operation of a mobile device according to an embodiment of the present invention.

The operation of the mobile device according to an embodiment of the present invention may include connecting to a Wi-Fi network (510) and detecting an interruption of a Wi-Fi signal while being connected to the Wi-Fi network (520).

In response to detecting the interruption of the Wi-Fi signal, the mobile device may obtain a probability that the mobile device belongs to an exit zone (530). The probability that the mobile device belongs to the exit zone may be obtained, in response to detecting the interruption of the Wi-Fi signal, by obtaining at least one received signal strength indicator (RSSI), and calculating the probability that the mobile device belongs to the exit zone, based on an output obtained from inputting the obtained at least one RSSI into a trained classifier.

The classifier may be configured to calculate the probability that the mobile device belongs to the exit zone, based on the obtained at least one RSSI as well as user data for a user of the mobile device. The user data may include at least one of time data, a day of the week, a user's trajectory, viewed applications, data from the applications, and data from at least one sensor.

The classifier may be trained prior to calculating the probability that the mobile device belongs to the exit zone. The training of the classifier may include obtaining a plurality of RSSIs at a plurality of timing points, assigning a first tag indicating an inner zone to at least one first RSSI of the plurality of RSSIs when no interruption of the Wi-Fi signal occurs, assigning a second tag indicating the exit zone to at least one second RSSI of the plurality of RSSIs when the Wi-Fi signal is interrupted, and training the classifier using the at least one first RSSI with the first tag being assigned and the at least one second RSSI. The inner zone may represent either an area where the provision of Wi-Fi service is expected to be available or an area where connection to the Wi-Fi network of the mobile device should be maintained, while the outer area may represent either an area where the provision of the Wi-Fi service is expected to be unavailable or an area where the connection to the Wi-Fi network should be terminated and a connection to another communication network (e.g. a cellular network) be attempted.

When the probability that the mobile device belongs to the exit zone is greater than or equal to the threshold, the mobile device may disconnect the Wi-Fi network and connect to the cellular network (540). When the probability that the mobile device belongs to the exit zone is greater than or equal to the threshold, the mobile device may further generate a notification. When the probability of the mobile device belonging to the exit zone is greater than or equal to the threshold, it may mean that the mobile device leaves a residence where Wi-Fi is serviced, and then a notification corresponding to this situation may be generated. For example, the notification may include a notification on weather forecast.

When the probability that the mobile device belongs to the exit zone is less than the threshold, the mobile device may maintain a connection to the Wi-Fi network (550).

Figure 6:
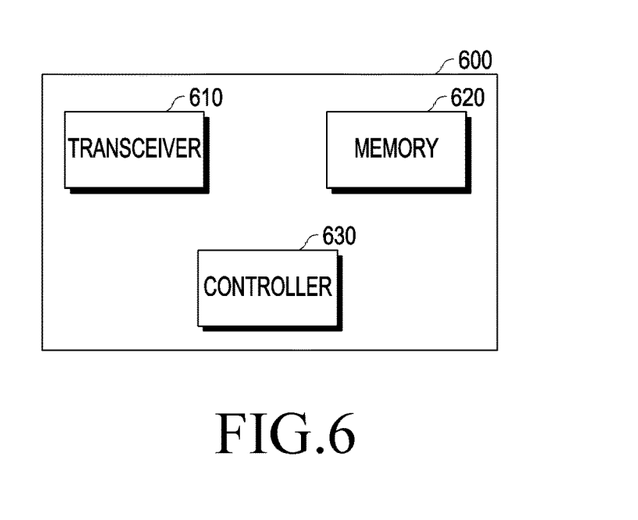
FIG. 6 illustrates a block diagram of a mobile device according to an embodiment of the present invention.

FIG. 6 is a block diagram showing a mobile device according to an embodiment of the present invention. The mobile device 600 may include a transceiver 610, a memory 620, and a controller 630.

The mobile device 600 may communicate with other devices or networks through the transceiver 610. Through the transceiver 610, the mobile device may detect an external signal or may transmit a signal. The transceiver 610 may support conventional communication schemes, such as, for example, Wi-Fi communication, cellular communications (e.g., long-term evolution (LTE), LTE-Advanced (LTE-A), mm-Wave communication, code division multiple access (CDMA), wideband CDMA (WCDMA), and so on), short-range communications (Bluetooth), although not limited thereto.

The memory 620 may store temporary or non-transitory data necessary for the operation of the mobile device 600. The memory 620 may include a temporary storage medium (e.g., random access memory (RAM)), and a non-transitory storage medium (e.g., read-only memory (ROM), a hard disk, a floppy disk, a CD-ROM, a solid state drive (SSD), and so on). The memory 620 may store instructions for driving the mobile device 600. The instructions stored in the memory 620 may be executed by the controller 630 to operate the mobile device 600. The weak signal buffer and database described above in conjunction with FIG. 2 may be included in the memory 620 or implemented through the memory 620.

The controller 630 may be implemented with one or more processors. The controller 630 may be connected to other components of the mobile device 600 having the transceiver 610 and the memory 620 to control the operation of the mobile device 600 and the operations of the components in the mobile device 600. That is, it should be noted that the operation performed by the mobile device 600 may be substantially performed or controlled by the controller 630. The aforementioned network switching device may be implemented with at least one separate processor of one or more processors implementing the controller 630, or with at least the controller 630 performing instructions to carry out a function of the network switching device of the instructions stored in the memory 620.

Heretofore, various embodiments of the present invention have been described with reference to the accompanying drawings, but those having ordinary knowledge in the art to which the present invention pertains will understand that they can be implemented in other specific forms without departing from the technical spirit or essential features of the present invention. Therefore, it should be understood that those embodiments as described above are only illustrative and non-limiting in all respects.

The invention claimed is:

1. A method for operating network switching by a mobile device, comprising:
   connecting to a Wi-Fi network;
   detecting an interruption of a Wi-Fi signal of the Wi-Fi network, while the mobile device is connected to the Wi-Fi network;
   in response to detecting the interruption of the Wi-Fi signal, obtaining a probability that the mobile device is located in an exit zone based on at least one of a received signal strength indicator (RSSI) of the Wi-Fi signal or user data for the mobile device, wherein the user data comprises a day of a week and the exit zone represents an area where a provision of a Wi-Fi service is expected to be unavailable;
   when the probability that the mobile device is located in the exit zone is greater than or equal to a threshold value, disconnecting the Wi-Fi network and connecting to a cellular network; and
   when the probability that the mobile device is located in the exit zone is less than the threshold value, maintaining connection to the Wi-Fi network,
   wherein the obtaining of the probability that the mobile device is located in the exit zone comprises:
      in response to detecting the interruption of the Wi-Fi signal, obtaining the RSSI, and
      calculating the probability that the mobile device is located in the exit zone, based on an output from a trained classifier into which the obtained at least one RSSI is inputted, and
   wherein for training the classifier, the method further comprises:
      obtaining a plurality of RSSIs at a plurality of timing points,
      assigning a first tag indicating an inner zone to a first RSSI of the plurality of RSSIs when no interruption of the Wi-Fi signal occurs, the inner zone representing an area where provision of Wi-Fi service is expected to be available,
      storing, into a weak signal buffer, a second RSSI of the plurality of RSSIs when the interruption of the Wi-Fi signal occurs,
      assigning a second tag indicating the exit zone to the second RSSI stored in the weak signal buffer when the Wi-Fi signal is lost,
      assigning the first tag to the second RSSI stored in the weak signal buffer when the Wi-Fi signal is recovered, and
      training the classifier by using the first RSSI to which the first tag is assigned and the second RSSI to which the first tag or the second tag is assigned.

2. The method of claim 1, wherein the trained classifier is configured to calculate the probability that the mobile device is located in the exit zone, using a machine learning algorithm or a neural network.

3. The method of claim 1,
   wherein the trained classifier is configured to calculate the probability that the mobile device is located in the exit zone, based on at least one of the RSSI and the user data for the mobile device.

4. The method of claim 1, further comprising:
   generating a notification when the probability that the mobile device is located in the exit zone is greater than or equal to the threshold value, the notification comprising a notification on weather forecast.

5. A mobile device for operating network switching, comprising:
   memory storing instructions; and
   at least one processor, wherein the instructions, when executed by the at least one processor, cause the mobile device to:
      connect to a Wi-Fi network,
      detect an interruption of a Wi-Fi signal of the Wi-Fi network, while the mobile device is connected to the Wi-Fi network,
      in response to detecting the interruption of the Wi-Fi signal, obtain a probability that the mobile device is located in an exit zone based on at least one of a received signal strength indicator (RSSI) of the Wi-Fi signal or user data for the mobile device, wherein the user data comprises a day of a week and the exit zone represents an area where a provision of a Wi-Fi service is expected to be unavailable,
      when the probability that the mobile device is located in the exit zone is greater than or equal to a threshold value, disconnect the Wi-Fi network and connect to a cellular network, and
      when the probability that the mobile device is located in the exit zone is less than the threshold value, maintain connection to the Wi-Fi network,
   wherein for the obtaining of the probability that the mobile device is located in the exit zone, the instructions, when executed by the at least one processor, cause the mobile device to:
      in response to detecting the interruption of the Wi-Fi signal, obtain the RSSI, and
      calculate the probability that the mobile device is located in the exit zone, based on an output from a trained classifier into which the obtained at least one RSSI is inputted, and
   wherein for training of the classifier, the instructions, when executed by the at least one processor, cause the mobile device further to:
      obtain a plurality of RSSIs at a plurality of timing points,
      assign a first tag indicating an inner zone to a first RSSI of the plurality of RSSIs when no interruption of the Wi-Fi signal occurs, the inner zone representing an area where the provision of Wi-Fi service is expected to be available, store, into a weak signal buffer, a second RSSI of the plurality of RSSIs when the interruption of the Wi-Fi signal occurs, assign a second tag indicating the exit zone to the second RSSI stored in the weak signal buffer when the Wi-Fi signal is lost, assign the first tag to the second RSSI stored in the weak signal buffer when the Wi-Fi signal is recovered, and train the classifier by using the first RSSI to which the first tag is assigned and the second RSSI to which the first tag or the second tag is assigned.

6. The mobile device of claim 5, wherein the trained classifier is configured to calculate the probability that the mobile device is located in the exit zone, using a machine learning algorithm or a neural network.

7. The mobile device of claim 5,
wherein the trained classifier is configured to calculate the probability that the mobile device is located in the exit zone, based on the RSSI and the user data for the mobile device.

8. The mobile device of claim 5, wherein the instructions, when executed by the at least one processor, cause the mobile device further to generate a notification when the probability that the mobile device is located in the exit zone is greater than or equal to the threshold value, the notification comprising a notification on weather forecast.

9. A non-transitory computer-readable storage medium comprising instructions for network switching, in which the instructions, when executed by at least one processor included in a mobile device, cause the mobile device to perform operations comprising:

connecting to a Wi-Fi network;

detecting an interruption of a Wi-Fi signal of the Wi-Fi network, while the mobile device is connected to the Wi-Fi network;

in response to detecting the interruption of the Wi-Fi signal, obtaining a probability that the mobile device is located in an exit zone based on at least one of a received signal strength indicator (RSSI) of the Wi-Fi signal or user data for the mobile device, wherein the user data comprises a day of a week and the exit zone represents an area where a provision of a Wi-Fi service is expected to be unavailable;

when the probability that the mobile device is located in the exit zone is greater than or equal to a threshold value, disconnecting the Wi-Fi network and connecting to a cellular network; and when the probability that the mobile device is located in the exit zone is less than the threshold value, maintaining connection to the Wi-Fi network, wherein the obtaining of the probability that the mobile device is located in the exit zone comprises:

in response to detecting the interruption of the Wi-Fi signal, obtaining the RSSI, and calculating the probability that the mobile device is located in the exit zone, based on an output from a trained classifier into which the obtained RSSI is inputted, and wherein for training the classifier, the operations further comprises:

obtaining a plurality of RSSIs at a plurality of timing points, assigning a first tag indicating an inner zone to a first RSSI of the plurality of RSSIs when no interruption of the Wi-Fi signal occurs, the inner zone representing an area where the provision of Wi-Fi service is expected to be available, storing, into a weak signal buffer, a second RSSI of the plurality of RSSIs when the interruption of the Wi-Fi signal occurs, assigning a second tag indicating the exit zone to the second RSSI stored in the weak signal buffer when the Wi-Fi signal is lost, assigning the first tag to the second RSSI stored in the weak signal buffer when the Wi-Fi signal is recovered, and training the classifier by using the first RSSI to which the first tag is assigned and the second RSSI to which the first tag or the second tag is assigned.

10. The non-transitory computer-readable storage medium of claim 9,
wherein the trained classifier is configured to calculate the probability that the mobile device is located in the exit zone, using a machine learning algorithm or a neural network.

11. The non-transitory computer-readable storage medium of claim 10,
wherein the trained classifier is configured to calculate the probability that the mobile device is located in the exit zone, based on at least one of the RSSI and the user data for the mobile device.

12. The non-transitory computer-readable storage medium of claim 9, wherein the operations further comprises generating a notification when the probability that the mobile device is located in the exit zone is greater than or equal to the threshold value, the notification comprising a notification on weather forecast.

* * * * *